(12) United States Patent
Watanabe

(10) Patent No.: US 7,196,816 B2
(45) Date of Patent: Mar. 27, 2007

(54) METHOD OF APPLYING TRAPPING CONDITIONS

(75) Inventor: Akira Watanabe, Minamiashigara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 955 days.

(21) Appl. No.: 10/236,944

(22) Filed: Sep. 9, 2002

(65) Prior Publication Data
US 2003/0048475 A1    Mar. 13, 2003

(30) Foreign Application Priority Data
Sep. 12, 2001 (JP) .............................. 2001-276588

(51) Int. Cl.
H04N 1/40 (2006.01)
(52) U.S. Cl. ........................ 358/1.9; 358/517
(58) Field of Classification Search ............... 358/1.9, 358/1.4, 2.1, 504, 406, 517
See application file for complete search history.

(56) References Cited

U.S. PATENT DOCUMENTS

| 5,113,249 A | 5/1992 | Yosefi |
| 5,613,046 A | 3/1997 | Dermer |
| 6,031,544 A | 2/2000 | Yhann |
| 6,894,805 B2 * | 5/2005 | Degani et al. ............... 358/1.4 |

* cited by examiner

Primary Examiner—Thomas D. Lee
Assistant Examiner—Stephen Brinich
(74) Attorney, Agent, or Firm—Sughrue Mion, PLLC

(57) ABSTRACT

Trapping conditions including trapping parameters and trapping areas are established for the image of a certain page displayed on a display unit through an input device. Another page is specified to which the trapping conditions thus established for the image of the certain page are to be applied. Thus, the trapping conditions thus established for the image of the certain page can be applied to the image of the other page.

9 Claims, 20 Drawing Sheets

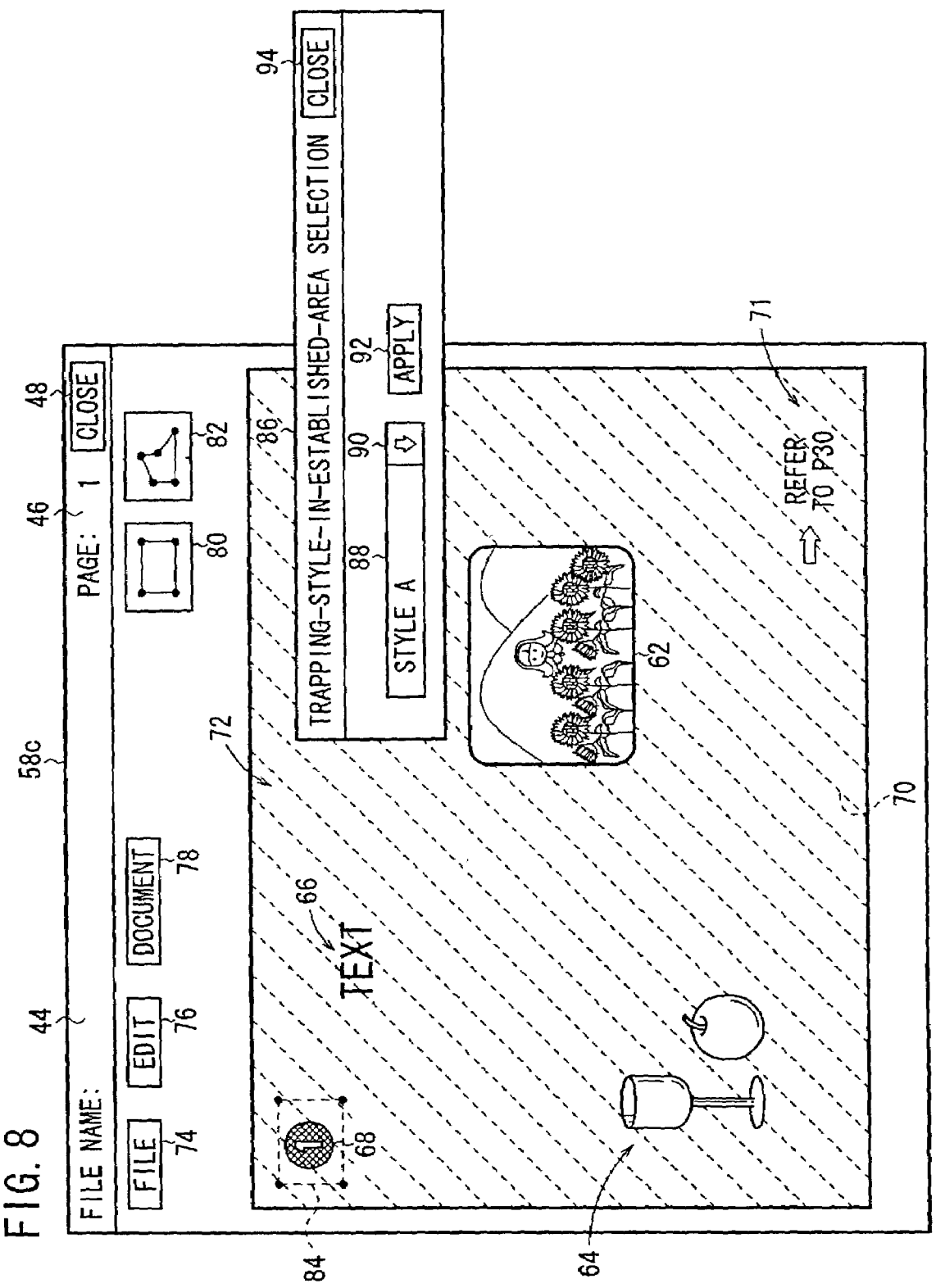

FIG. 9

FILE NAME:

| FILE | EDIT | DOCUMENT | PAGE: 1 | CLOSE |

TRAPPING STYLE EDITING: STYLE A

WIDTH
- TRAPPING WIDTH   **** POINT
- BLACK WIDTH      **** POINT

TRAPPING START POINT
- STEP LIMIT              **** %
- BLACK COLOR LIMIT       **** %
- BLACK DENSITY LIMIT     **** %
- SLIDING TRAPPING LIMIT  **** %

COLOR
- COLOR SCALING  **** %

IMAGE BOUNDARY CONDITION
- TRAPPING DIRECTION: BIDIRECTIONAL
  ☑ ADJACENT REGION
  ☐ OVERALL IMAGE
- TRAPPING ACCURACY  ****

[CANCEL] [OK]

[CLOSE]

TEXT

TRAPPING STYLE NAME
- STYLE A
- STYLE B
- STYLE C
  ...
- STYLE N

[NEW] [NAME CHANGE] [EDIT] [DELETE]

[CLOSE]

METHOD OF APPLYING TRAPPING CONDITIONS

BACKGROUND OF THE INVENTION

1. Field of the Invention

The present invention relates to a method of applying conditions regarding a trapping process to be effected on a boundary region between two adjacent colors in an image on a printed material, and more particularly to a method of applying trapping conditions which is preferably applicable to a trapping process on an electronic editing apparatus for generating separation plates assembled from individual original images according to a computer process using an image display device.

2. Description of the Related Art

Generally, there is known a method of generating a printed material with an image on a print sheet according to a multicolor printing process using a plurality of printing plates which correspond respectively to a plurality of primaries, e.g., C (cyan), M (magenta), Y (yellow), and K (black).

Images on printed materials generated according to the multicolor printing process contain a boundary region between two adjacent colors. In the color-dividing boundary region, a blank gap may occasionally be produced due to a positional misalignment between a plurality of printing plates, a shrinkage or elongation of the print sheet, or other deficiencies.

It has heretofore been customary to carry out a trapping process for filling such a gap in a color-dividing boundary region by enlarging a figure in a background color in the color-dividing boundary region, or enlarging a figure in a foreground color in the color-dividing boundary region, or generating a fine line with a color including color elements of the two adjacent colors and placing the fine line along the color-dividing boundary region.

Each of the enlarged area of the figure and the fine line is referred to as a trap width. Recently, there has been available a trapping area generating program which can be executed on an image processing apparatus by a computer process for determining trapping parameter including those trap widths.

Trapping parameters are parameters, including the trap widths, used in the trapping process for determining which figure in the background or foreground color is to be enlarged (usually, the figure in a bright color is to be enlarged), and determining at least what difference between the equivalent neutral densities of the two adjacent colors is to be present before the trapping process is to be performed.

On the image processing apparatus in which the trapping area generating program is installed, the user uses an input device such as a mouse to specify an area where trap widths are to be generated (hereinafter referred to as "trapping area") in an image on a page displayed on an image display device, as a rectangular frame or a free figure frame.

The image on the page displayed on the image display device includes all objects that constitute the page, i.e., a continuous gradation image such as a photograph captured by a scanner or a digital still camera, characters and figures entered on an electronic editing apparatus, pagination, etc.

According to the trapping area generating program, suitable trap widths are generated depending on the equivalent neutral densities of two adjacent colors in the color-dividing boundary region between the two adjacent colors in a specified trapping area.

For effecting a trapping process on a printed material having a plurality of pages, i.e., a book or the like, it is necessary to establish trapping conditions including trapping parameters and a trapping area for images on each page (also referred to as "objects to be trapped" or "editing materials").

A task for establishing trapping conditions to indicate on which part of an image a trapping process is to be performed is a time-consuming process which needs to be carried out by an operator with professional knowledge.

Conventionally, it is necessary to establish trapping conditions for images on all pages of a printed material for each of the pages, and a process of establishing such trapping conditions is considerably time-consuming.

Particularly, header, footer, and logotype which serve as images on pages are present on all the pages. It is therefore a highly labor-intensive work to establish trapping conditions for these images on each of all the pages.

SUMMARY OF THE INVENTION

It is therefore an object of the present invention to provide a method of applying trapping conditions to make efficient a trapping process for a printed material made up of a plurality of pages, thereby shortening a period of time required to carry out the trapping process.

According to the present invention, there is provided a method of applying trapping conditions in an image processing apparatus having a memory device for storing image information of pages of a printed material having a plurality of pages as page data, a display unit for displaying an image represented by the page data loaded in a memory, and an input device for establishing trapping conditions for the page data corresponding thereto based on the displayed image, comprising the steps of establishing trapping conditions for page data through the input device based on the image of a given page, corresponding to the page data, which is displayed on the display unit, saving the trapping conditions established for the page data of the given page in the memory device, and specifying another page to which the trapping conditions established and saved for the page data of the given page are to be applied.

Since the trapping conditions established for the image of the given page are applied to the image of the other page, the process of inputting trapping conditions for the other page can be eliminated.

In the trapping condition establishing step, trapping conditions may be established for all or part of the image of the given page. The flexibility of the application of the trapping conditions to the other page is thus increased.

In the other page specifying step, a trapping condition applying page specifying view may be displayed on the display unit, and data may be inputted through the input device to specify the other page to which the trapping conditions established and saved for the page data of the given page are to be applied. The other page can thus be specified simply and reliably.

In the other page specifying step, the trapping conditions may include a trapping parameter including a trap width and a trapping area.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a view showing a displayed trapping process view for specifying trapping parameters;

FIG. 9 is a view showing a displayed trapping process view for specifying trapping parameters;

DESCRIPTION OF THE PREFERRED EMBODIMENTS

Figure 1:
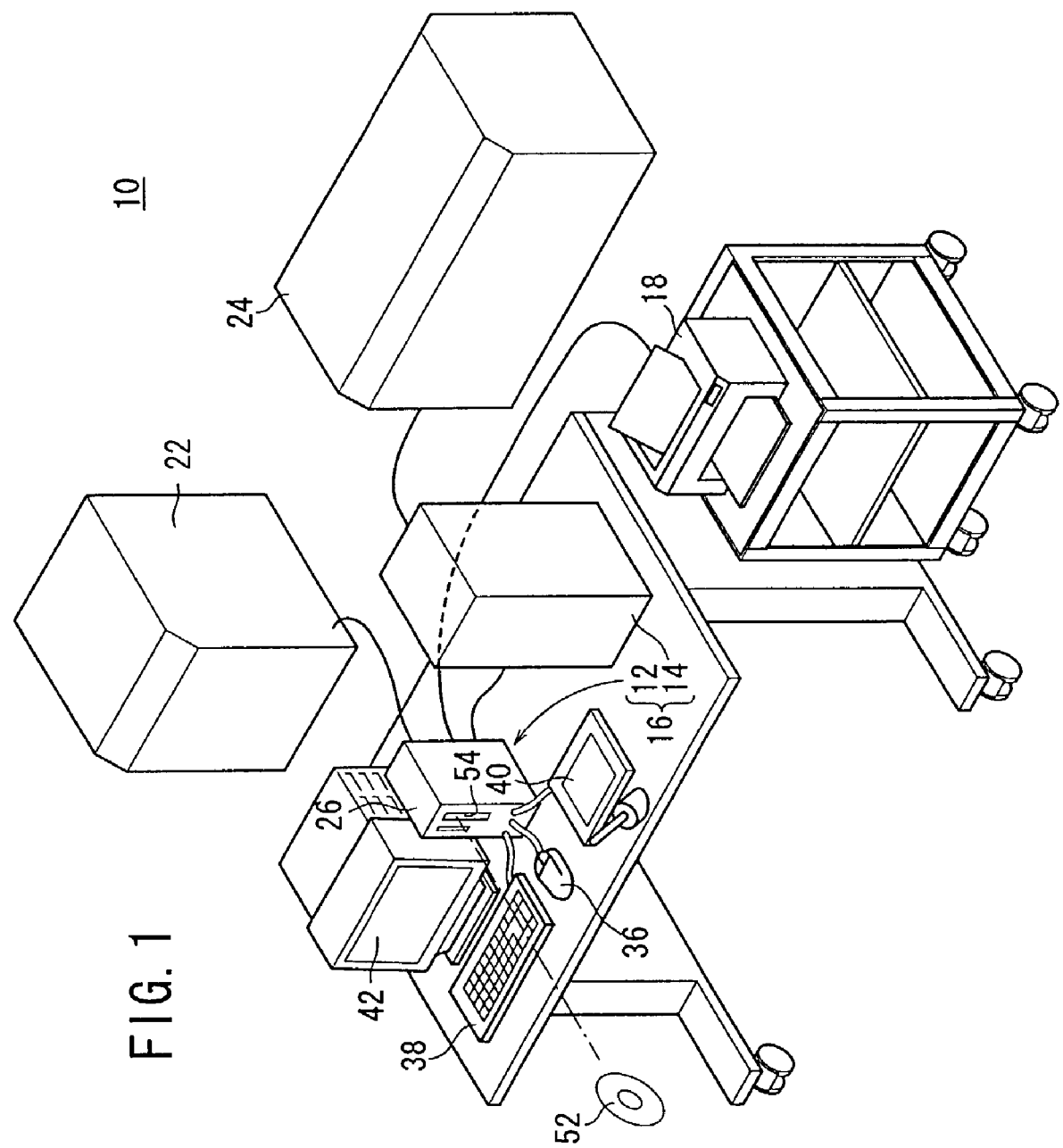
FIG. 1 is a perspective view of an electronic assembling apparatus to which the present invention is applied.

FIG. 1 shows in perspective an electronic assembling apparatus 10 to which the present invention is applied.

As shown in FIG. 1, the electronic assembling apparatus 10 includes an electronic editing device 16 having a computer 12 as an image processing device and a raster image processor (hereinafter referred to as "RIP") 14 connected to the computer 12. The computer 12 and the RIP 14 are shown as being separate from each other, but may be integrally combined with each other in a unitary assembly.

A color printer 18 and a color scanner 22 are connected to the computer 12, and an image setter 24 is connected to the RIP 14.

The color printer 18 prints an image processed by the computer 12 simply as a proof sheet. The color scanner 22 reads an image such as a picture, characters, a figure, etc. from an original, and supplies image data representing three colors (C, M, Y) into which the read image is divided to the computer 12. The supplied image data is stored in a given storage area of a storage device such as a hard disk of the computer 12. Although not shown, image data captured by a digital camera or the like is also supplied to the computer 12 and stored in the storage device thereof.

On the computer 12, the operator edits characters, illustrations, etc. on a display screen, applies an image represented by the image data, and performs an image processing process and an editing process such as to apply trapping conditions.

Image data to be processed by the computer 12 and image data after being edited thereby comprises PDF (Portable Document Format) data in a page description language, and is supplied to the RIP 14. The PDF data contains image information of a printed material made up of a plurality of pages, stored for each page, and will hereinafter be referred to as page data.

The RIP 14 converts the supplied RIP data to binary raster image data, and supplies the binary raster image data to the image setter 24. If the supplied RIP data is unseparated image data, then the RIP 14 separates the supplied RIP data into four colors of C, M, Y, K and then converts them to raster image data.

The image setter 24 applies a light beam such as a laser beam to film plates coated with a photosensitive material based on the supplied raster image data according to a scanning exposure process, thereby producing latent images, then develops the latent images into films in four colors of C, M, Y, K with visible images formed thereon, and outputs the films. The image setter 24 may be replaced with a CTP (Computer To Plate) apparatus for directly outputting printing plates.

Figure 2:
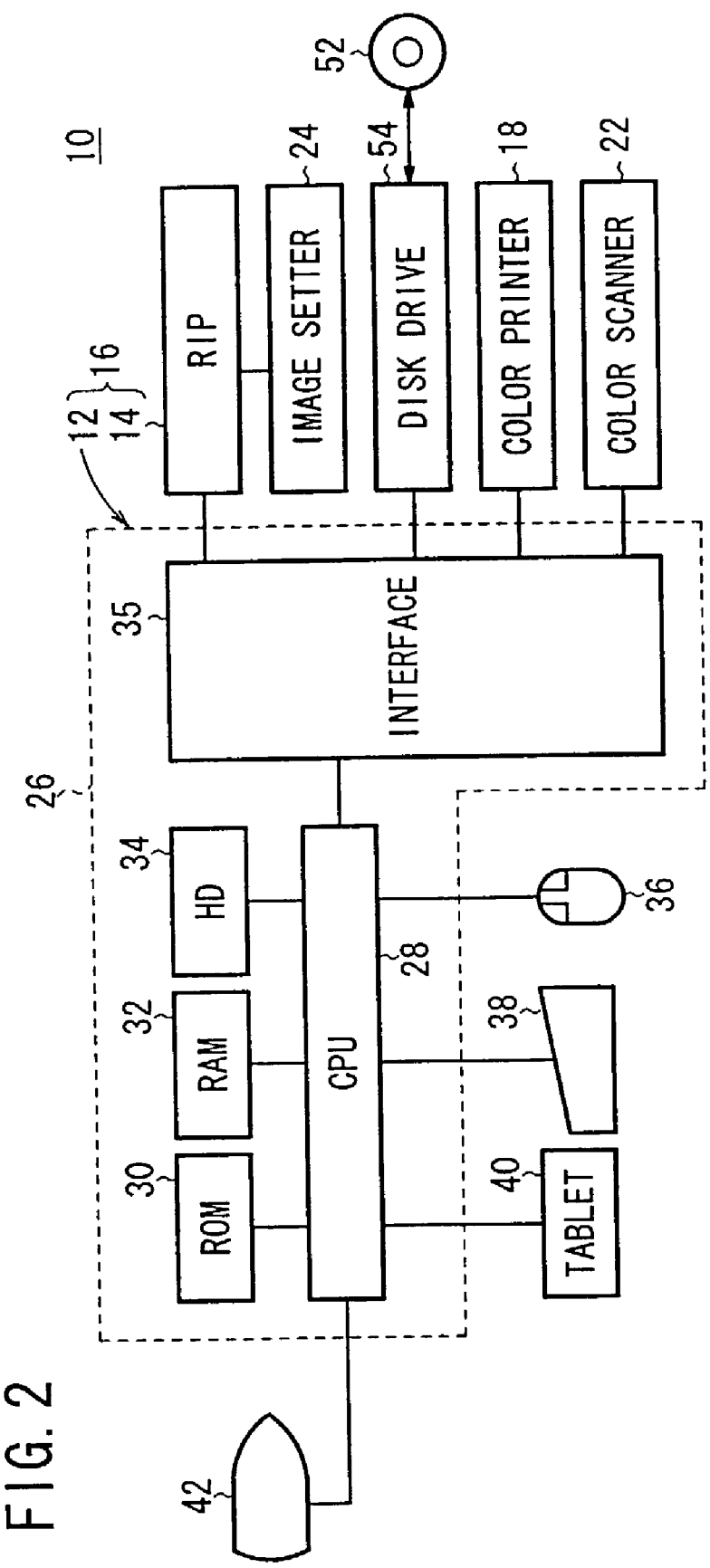
FIG. 2 is a block diagram of the electronic assembling apparatus shown in FIG. 1.

FIG. 2 shows in block form the electronic assembling apparatus 10 constructed around the computer 12. The computer 12 has, in a main unit, a CPU (Central Processing Unit) 28 functioning as control, processing, and calculating means. To the CPU 28, there are connected a ROM (Read Only Memory) 30 storing a system program, etc., a RAM (Random Access Memory) 32 for use as a main working memory, and a hard disk 34 serving as an auxiliary storage device for storing programs including a trapping area generating program corresponding to a method of applying trapping conditions according to the present invention, and data such as PDF data representing image information of pages of a printed material which is made up of a plurality of pages.

The trapping area generating program is stored in an optical disc 52 such as CDROM (Compact Disc Read Only Memory), a CDR (Compact Disc Recordable), a DVDROM (Digital Versatile Disc Read Only Memory), or the like, which serves as a recording medium, downloaded into the hard disk 34 through a disc drive 54 and an interface 35, and loaded into the RAM 32 for use when necessary. The trapping area generating program may alternatively be downloaded from an outside server into the computer 12 via a communication link, not shown.

To the CPU 28, there are also connected a mouse 36, a keyboard 38, and a tablet 40, each functioning as a data input device or a pointing device.

A display unit 42 such as a CRT or the like for displaying image information of each page as an image (hereinafter referred to as "object to be trapped" or "editing material") is also connected to the CPU 28. The image displayed on the display unit 42 is an image displayed on the display screen based on the page data loaded in an image memory (not shown), and includes heater, footer, logotype, characters, illustrations, photographs, etc.

The color printer 18, the color scanner 22, and the RIP 14 connected to the image setter 24 are individually connected to the CPU 28 through the interface 35.

An overall processing sequence of the electronic assembling apparatus 10 will be described below with reference to FIG. 3.

Figure 3:
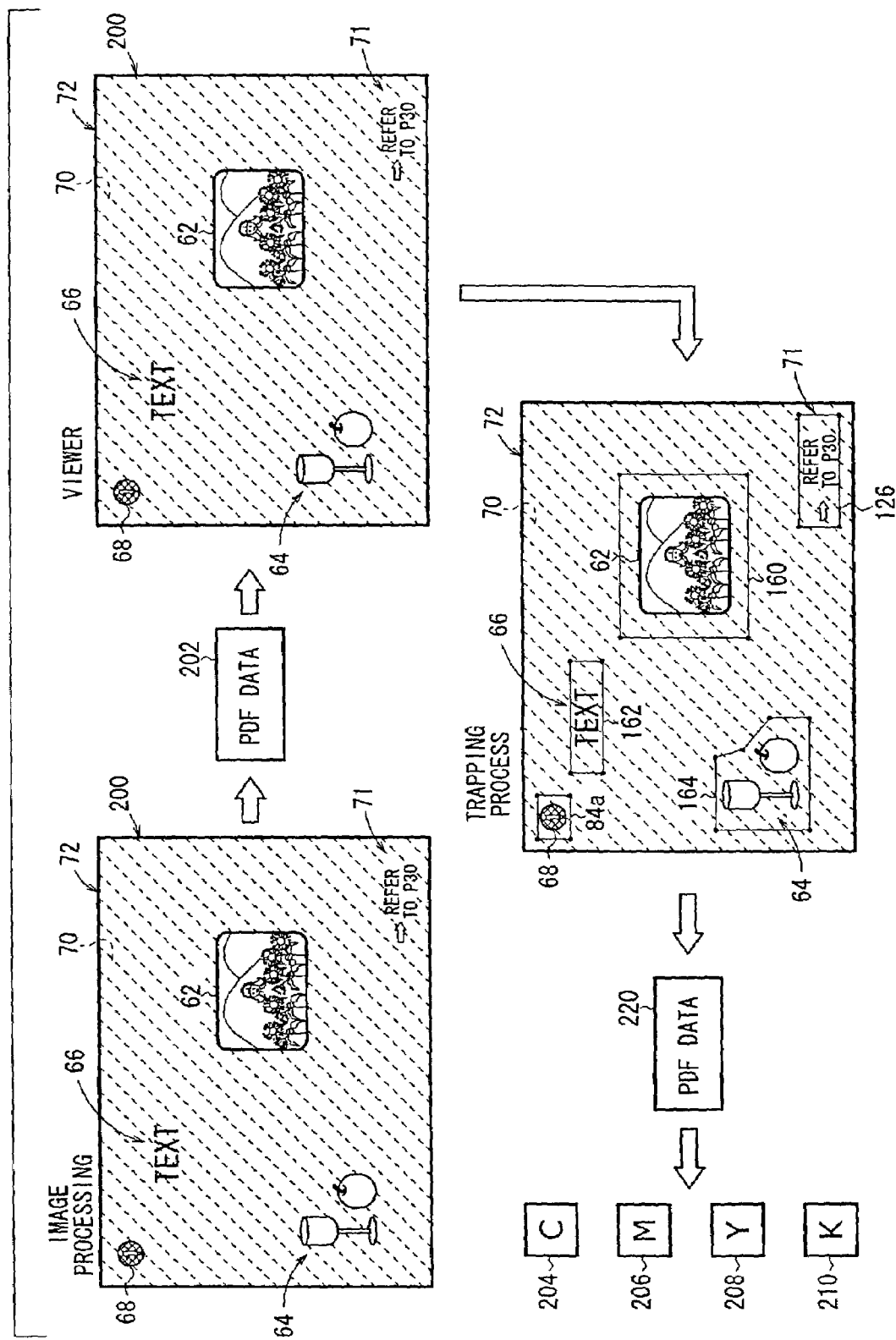
FIG. 3 is a view illustrative of an overall processing sequence of the electronic assembling apparatus shown in FIG. 1.

The display unit 42 of the electronic editing device 16 displays an editing view 200 for an image processing process as shown in an upper left area in FIG. 3. The editing view 200 displays thereon pre-edited layout information as a page image 72 including a photographic image 62 (containing a plurality of sunflowers, a person, a plurality of mountains, and the sky) captured and applied by the color scanner or a digital camera (not shown), a line image 64 (containing a glass and an apple) generated according to image drawing software using the mouse 36, a character image 66 (which is read "TEXT") generated according to character input software using the keyboard 38, a pagination image 68 (indicating first page in FIG. 3) generated according to editing software using the tablet 40, and a background image 70 (shown obliquely hatched in FIG. 3) and a remark image 71 (containing an arrow and read "see P30" indicating a page to be referred to) which are generated according to the editing software using the keyboard 38, etc.

The background image 70 comprises, for example, an image in a light color with a pattern included. Although not shown, a sentence written with a horizontal row of black letters is inserted in the background image 70.

The images contained in the page image 72 are processed for gradation conversion, coloring, sharpness emphasis, etc. by the editing software. The processed page image 72 is stored as PDF data (page data) 202 which is page description language data in a certain area in the hard disk 34. In this manner, the image information of all the pages of the printed material is stored as PDF data 202 of all the pages in the given area in the hard disk 34.

Then, in order to perform a trapping process, the PDF data 202 stored in the given area of the hard disk 34 is read, developed according to viewer software, and displayed as the page image 72 as shown in an upper right area in FIG. 3.

Then, each of the images contained in the page image 72 is subjected to a trapping process for specifying trapping conditions made up of trapping parameters and a trapping area. The page image 72 which has been subjected to the trapping process as shown in a lower central area in FIG. 3 is stored as PDF data 220 in a given area in the hard disk 34.

The page image 72 which has been subjected to the trapping process contains parameter-established trapping areas 84a, 126, 160, 162, 164 surrounded by rectangular or free figure frames.

Then, the PDF 220 is read from the given area in the hard disk 34, and the RIP 14 outputs films 204, 206, 208, 210 in the colors of C, M, Y, K based on the PDF 220. The films 204, 206, 208, 210 are then installed in a printing press, not shown, and inks in the respective colors of C, M, Y, K applied to the films 204, 206, 208, 210 are successively transferred to a print sheet, not shown, to produce a color printed material for the page according to a multicolor printing process.

The overall processing sequence of the electronic assembling apparatus 10 according to the present embodiment has been described above.

Figure 4:
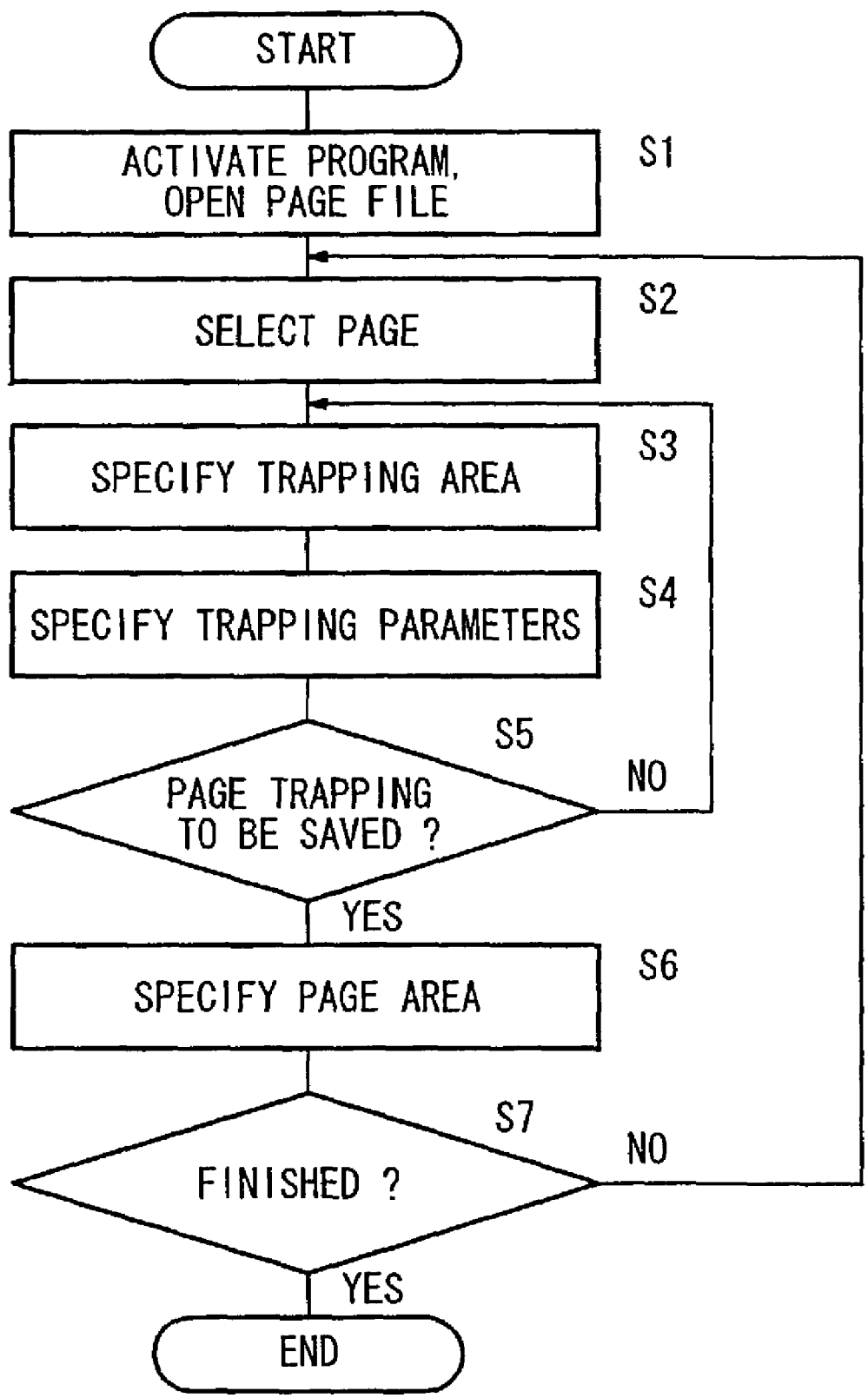
FIG. 4 is a flowchart of a method of applying trapping conditions according to the present invention.

Processing details of the electronic assembling apparatus 10 will now be described below with reference to FIG. 4, primarily with respect to a process using a trapping area generating program including various GUIs (Graphic User Interfaces). The trapping area generating program has been generated by the inventor of the present invention and incorporated as a plug-in-in the viewer software referred to above. While the processing and control entity is the CPU 28 in the operation of electronic assembling apparatus 10, it will be referred to only occasionally, but not at all times, for the sake of brevity.

Figure 5:
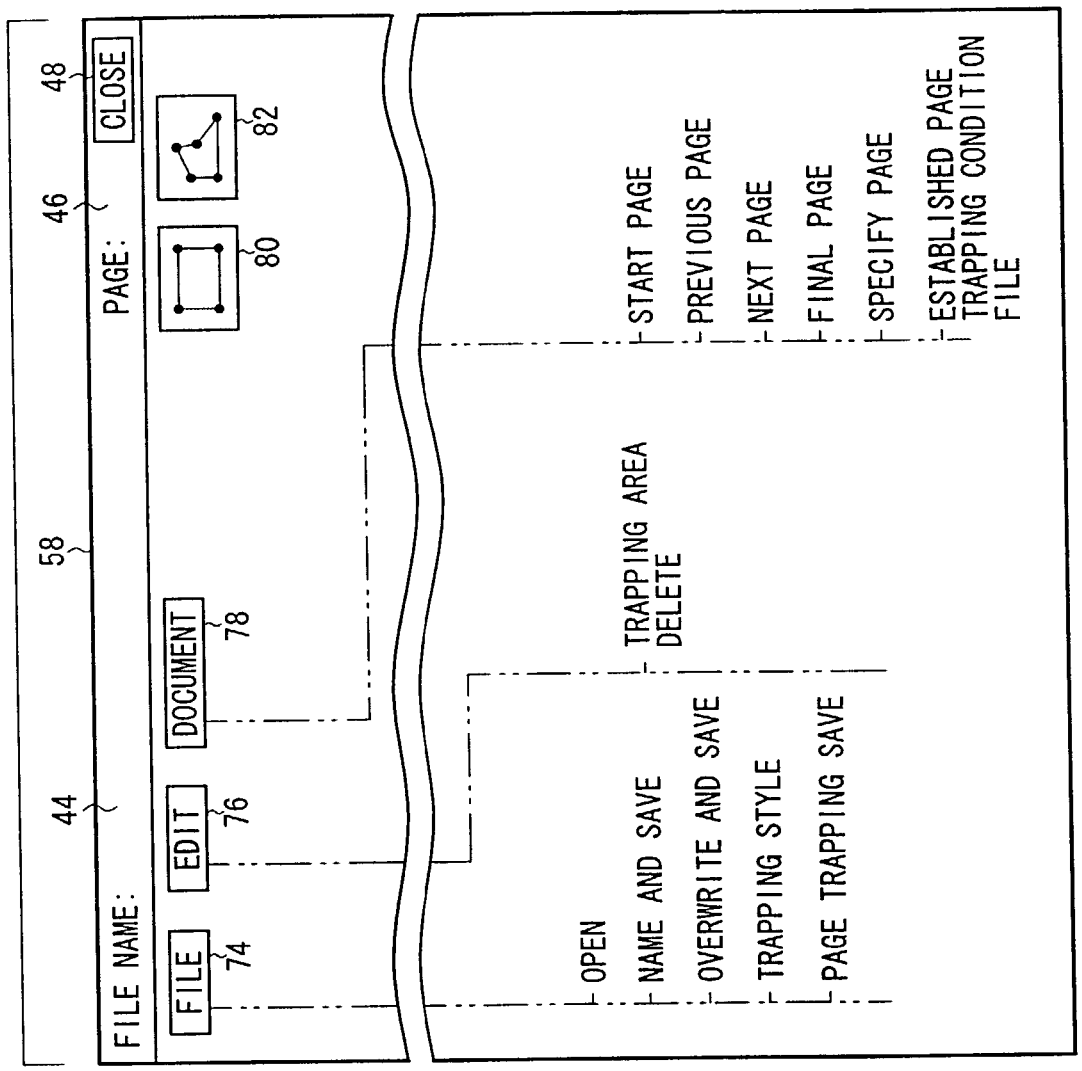
FIG. 5 is a view showing a displayed initial view in a trapping process.

In step S1, the user activates the trapping area generating program, which displays a trapping process view 58 shown in FIG. 5 on the display unit 42. The trapping process view 58 shown in FIG. 5 is an initial view which is displayed.

The trapping process view 58 has a page trapping condition file name field 44 and a page field 46. A "CLOSE" button 48 is a button for ending the trapping area generating program.

The trapping process view 58 displays, as GUIs, various buttons for the trapping process, e.g., a file menu button 74, an editing menu button 76, a document menu button 78, and a rectangular area selection button 80 and a free figure area selection button 82 for setting, using the mouse 36 or the like, areas (referred to as "trapping areas") where trapping widths are to be generated in the page image 72 displayed on the display unit 42.

When the user clicks on the document menu button 78 with the mouse 36, respective menus of "START PAGE", "PREVIOUS PAGE", "NEXT PAGE", "FINAL PAGE", "SPECIFY PAGE", and "ESTABLISHED PAGE TRAPPING CONDITION FILE" are displayed. Either one of these menus can be selected with the mouse 36. When the user clicks on the document menu button 78 again, these menus are closed, i.e., disappear.

When the user clicks on the editing menu button 76 in the trapping process view 58, a "trapping area deletion" menu that can be selected is displayed.

When the user clicks on the file menu button 74 in the trapping process view 58, respective menus of "OPEN", "NAME AND SAVE", "OVERWRITE AND SAVE", "TRAPPING STYLE (also referred to as "TRAPPING PROFILE"), and "SAVE TRAPPING FILE" are displayed.

Figure 6:
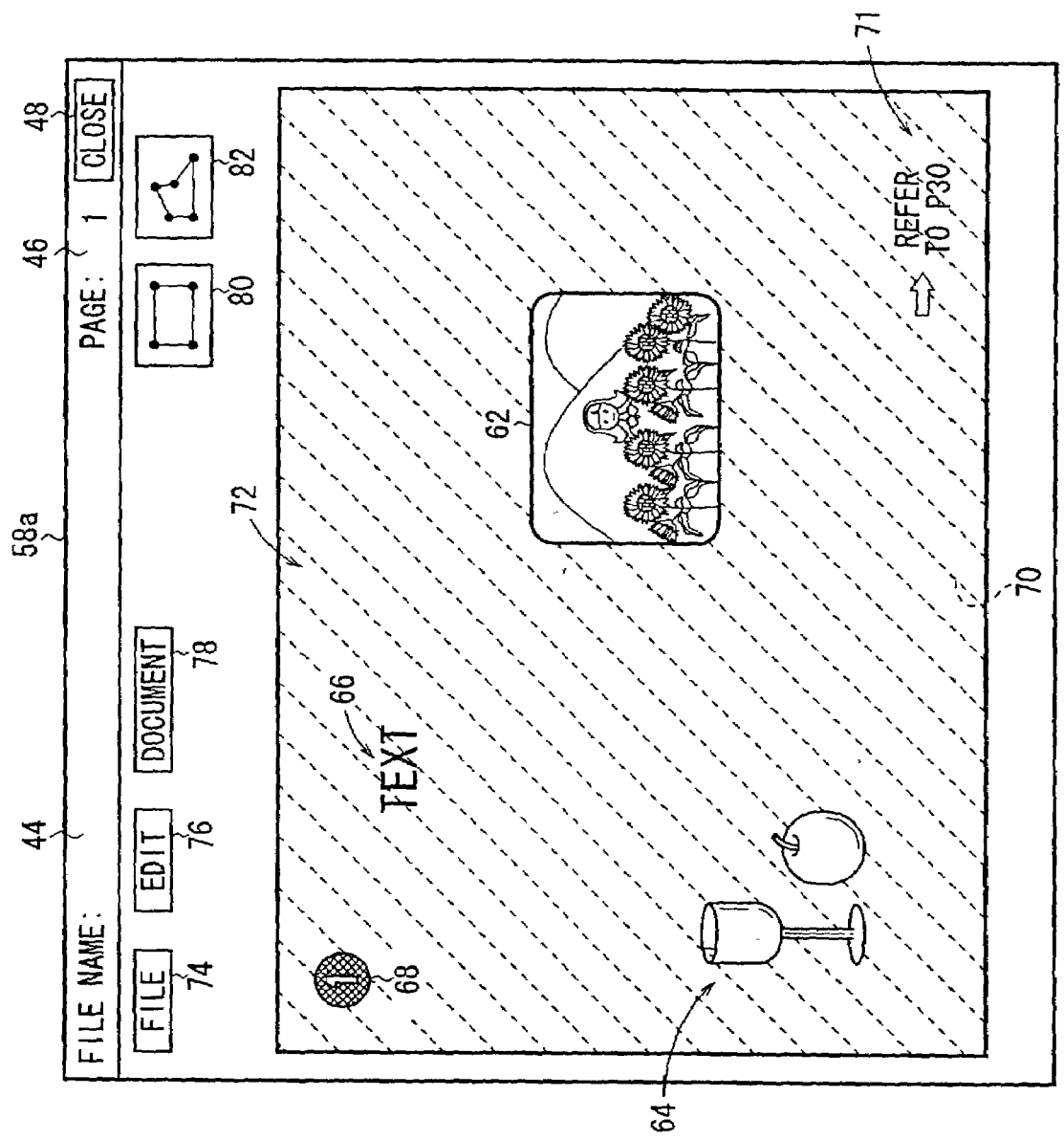
FIG. 6 is a view showing a displayed trapping process view in which one page of image data has been read.

While the trapping process view 58 is being displayed, when the user clicks on the file menu button 74 and select "OPEN", a list of page data files is displayed. When the user selects a page data file to which trapping conditions are to be applied, page data of a start page (first page) which is a leading page of the selected page data file is developed, and a page image 72 is displayed, in a trapping process image 58a as shown in FIG. 6, with the file name of the page data file being displayed in the page trapping condition file name field 44.

Then, in step S2, the user selects a page to which trapping conditions are to be applied. The user can click on the document menu 78 to select a desired page. Since the start page (first page) has been displayed in FIG. 6, control goes to next step S3.

With the page thus selected, PDF data 202 (see FIG. 3) of one page (first page) of image data of the printed material is usually read from the hard disk 34, and displayed on the display device 42.

In the trapping process image 58a, "1" indicating the first page is displayed in the page field 46.

The trapping process image 58a displays thereon, as described above, a photographic image 62 (containing a plurality of sunflowers, a person, a plurality of mountains, and the sky) captured and applied by the color scanner 22 or a digital camera (not shown), a line image 64 (containing a glass and an apple) generated according to image drawing software using the mouse 36, a character image 66 (which is read "TEXT") generated according to character input software using the keyboard 38, a pagination image 68 (indicating first page) generated according to editing software using the tablet 40, and a background image 70 and a remark image 71 (containing an arrow and read "see P30" indicating a page to be referred to) which are generated according to the editing software using the keyboard 38, etc.

The background image 70 comprises, for example, an image in a light color with a pattern included. The background image 70 is shown hatched with oblique dotted lines extending downwardly to the left.

The page image 72 may be printed by the printer 18 into a hard copy as a proof sheet.

Figure 7:
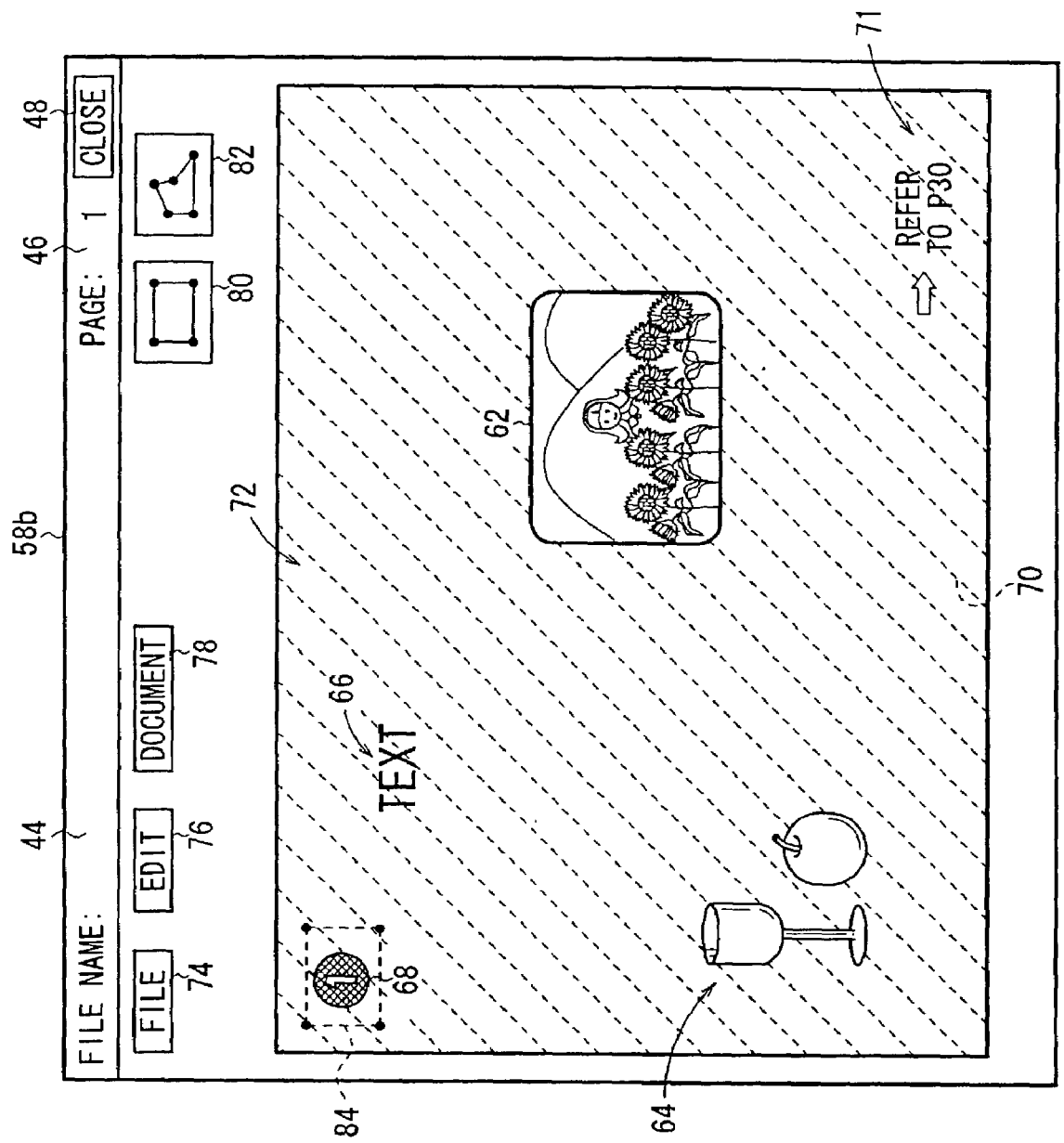
FIG. 7 is a view showing a displayed trapping process view in which a trapping area is specified in a desired portion of the image.

In step S3, the user specifies a trapping area. For example, the user selects the rectangular area selection button 80 with the mouse 36, thus establishing a trapping area 84 in the form of a dotted-line rectangular frame as shown in FIG. 7 (an area including the pagination area 68 is selected and established in FIG. 7), whereupon the trapping process image 58a changes to a trapping process image 58b. The size of the trapping area 84 may be determined by dropping a corner of the rectangular frame to a desired position and then dragging the length of a diagonal line from the dropped corner.

With the trapping area 84 thus established, the trapping process image 58b changes to a trapping process image 58c shown in FIG. 8 for establishing trapping parameters in step S4.

The trapping process image 58c automatically displays a trapping-style-in-established-area selection view 86. The trapping-style-in-established-area selection view 86 comprises a style name display window 88 for displaying the name of a trapping style which is being presently selected, an arrow button 90 for displaying all trapping styles presently stored in the hard disk 34 in a pull-down menu, an apply button 92, and a "CLOSE" button 94 for closing the trapping-style-in-established-area selection view 86.

A trapping style serves to establish a set of trapping parameters. Trapping styles include trapping styles stored as data in the trapping area generating program and prepared as default trapping styles, and trapping styles generated by the user.

When the user selects "TRAPPING STYLE" (see FIG. 5) in the file menu button 74, an updated trapping process view 58d shown in FIG. 9 is displayed. The updated trapping process view 58d includes a trapping style view 100 displaying a list of already registered trapping styles (styles A through N) in a trapping style name window 102. The trapping style view 100 includes a newly generating button 104 for newly generating a trapping style, a name change button 106 for changing a trapping style name, an editing button 108 for changing an already registered trapping style, a delete button 110 for deleting an unwanted trapping style, and a "CLOSE" button 120 for closing the trapping style view 100.

When the user selects "STYLE A", for example, from the list displayed in the trapping style name window 102, and clicks on the editing button 108, an editing view 122 for a trapping style, which indicates trapping parameters for the style A in detail, is displayed (already shown in FIG. 9).

In the editing view 122, a trapping width serves to specify the size of an adjacent object to be trapping, to be reduced or expanded, in terms of points (one point is equal to $\frac{1}{72}$ inch), and a black width is a trapping width in terms of points which is applied to a black object to be described later on and an object adjacent to the black object.

A black color limit with respect to a trapping start point represents a halftone % indicative of what halftone % of the black printing plate is to be regarded as the black object described above. If the halftone t of the black printing plate is set to 90%, then a black printing plate having a halftone % of 95% is a black object, and the black width is applied thereto. However, a black printing plate having a halftone % of 80% is not a black object, and the trapping width is applied thereto.

A step limit represents a relative density difference proportion between adjacent regions [(higher density—lower density)/lower density]. The trapping process is performed when the step limit is exceeded.

A sliding trapping limit represents such a value that the trapping process is performed if the difference between equivalent neutral densities of adjacent objects is equal to or greater than the sliding trapping limit.

Color scaling represents a value indicative of a reduction (%) in the equivalent neutral density for carrying out the trapping process.

A trapping direction is a setting indicative of whether an object whose equivalent neutral density is higher or an object whose equivalent neutral density is lower is to be trapped when the object to be trapped is trapped. The trapping direction which can be selected is bidirectional, a higher direction, or a lower direction.

An adjacent region is a setting to perform the trapping process only on a boundary with an external region when the object to be trapped is trapped.

An overall image indicates the trapping process to be performed on the overall image for each pixel.

A trapping accuracy refers to an accuracy setting indicative of how coarse the resolution of an image may be when the trapping process is carried out.

Trapping parameters representing contents of trapping styles are thus determined. The user can register trapping parameters under a new trapping style name selected using the name change button 106, by clicking on an OK button 124.

In FIG. 8, trapping parameters are established again in step S4. When the user clicks on the apply button 92 in the trapping-style-in-established-area selection view 86 while the trapping area 84 is being established on the pagination image 68 representative of the first page, the trapping parameters in the trapping area 84 are set to trapping parameters of "STYLE A".

Figure 10:
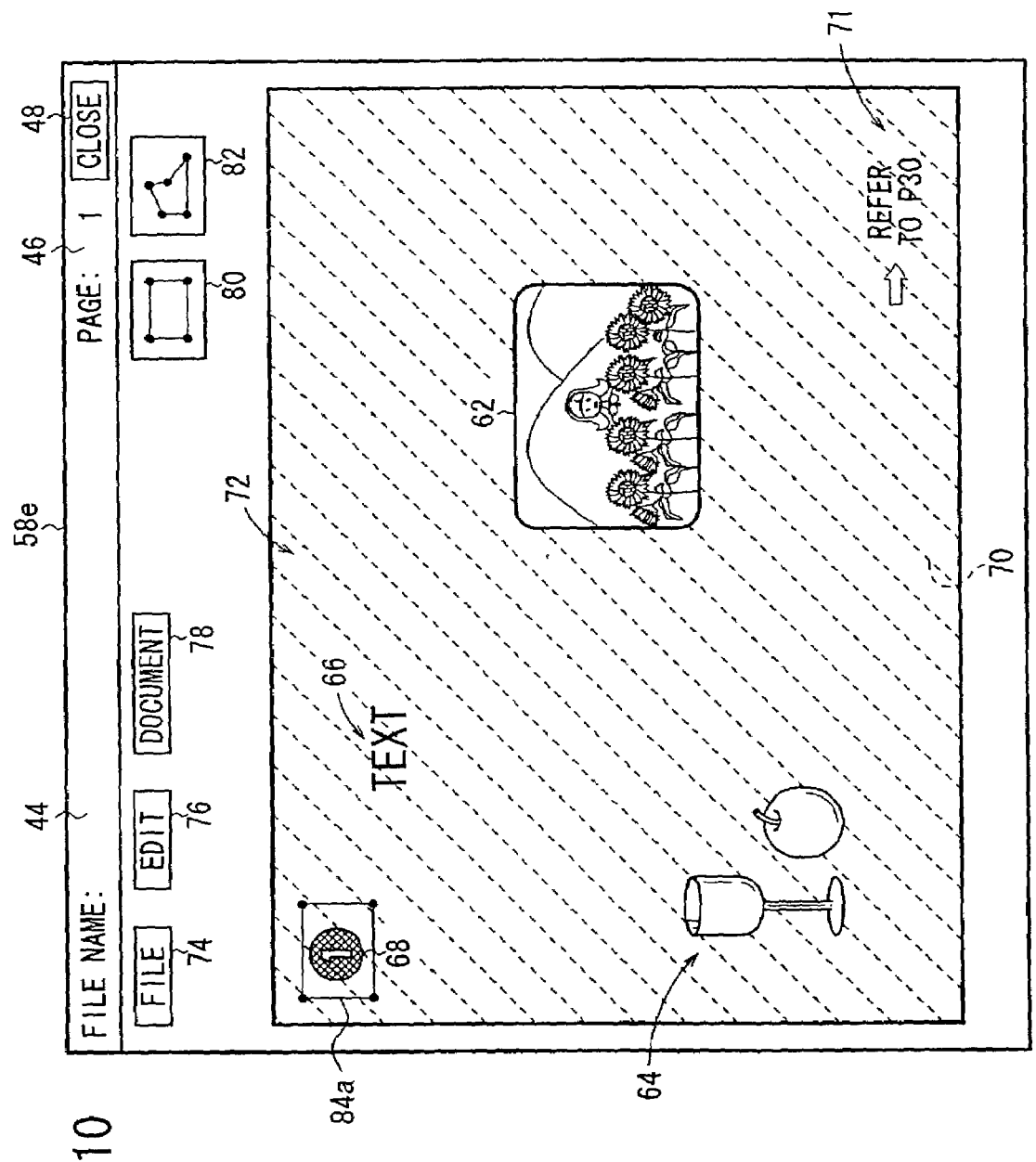
FIG. 10 is a view showing a displayed trapping process view in which trapping conditions have been established in one portion of the image.

At this time, the trapping area 84 indicated by the dotted-line rectangular frame is turned into a solid-line rectangular frame, and the updated trapping process view 58d changes to a trapping process view 58e showing an established parameter trapping area (also referred to as "trapping condition establishing area") 84a representing an area where trapping parameters are established (established area), as shown in FIG. 10.

In this manner, the trapping area specifying process in step S3 and the trapping parameter establishing process in step S4 establish part of trapping conditions for the corresponding page data, i.e., the page data of the first page, based on the page image 72.

If the user has not clicked on the file menu button 74 to select a "PAGE TRAPPING SAVE" menu, then the answer to step S5 is negative, and a trapping area can be established or specified in step S3.

In step S3, in the trapping process view 58e shown in FIG. 10, the user sets the remark image 71 in the lower right area in the page image 72 as a trapping area. Then, in step S4, the trapping style in the established trapping area is selected to be "STYLE B". At this time, a trapping process view 58f is displayed as shown in FIG. 11.

In the trapping process view 58f, an established parameter trapping area 126 in the form of a solid-line rectangular frame is displayed on the remark image 71 in the lower right area in the page image 72.

Figure 11:
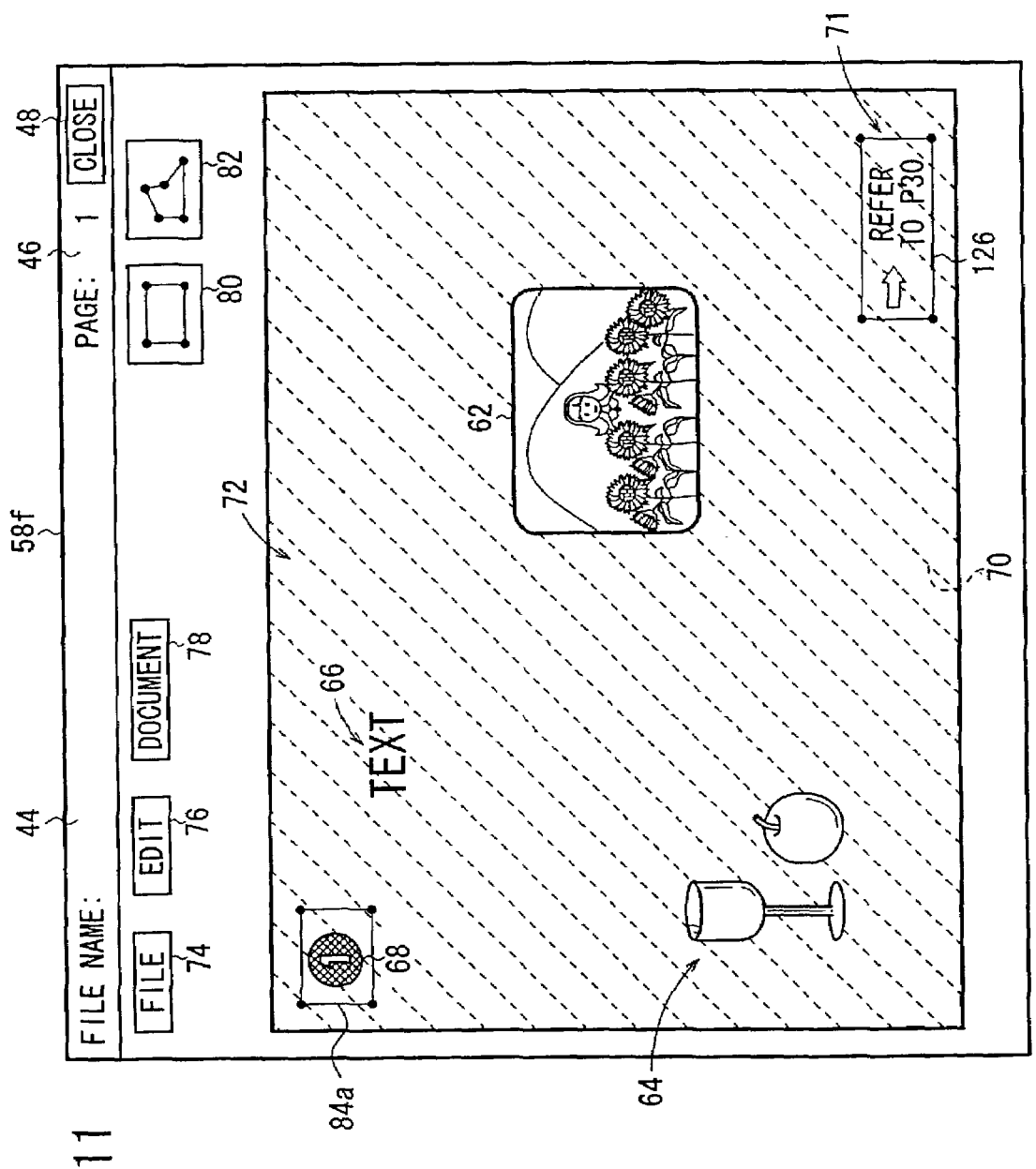
FIG. 11 is a view showing a displayed trapping process view in which trapping conditions have been established in two portions of the image.

If the trapping conditions for the pagination image 68 and the remark image 71 from the first page to the final page, e.g., 100th page, of the printed material are to be the same trapping conditions, then the user clicks on "PAGE TRAPPING SAVE" (see FIG. 5) in the file menu while the trapping conditions are being in those two images in the page image 72, i.e., while the trapping process view 58f shown in FIG. 11 is being displayed.

The answer to step S5 now becomes affirmative, and the trapping conditions can be saved into the hard disk 34. At this time, the file name in the page trapping condition file name field 44 is changed to "COMMON TRAPPING CONDITIONS 1".

Figure 12:
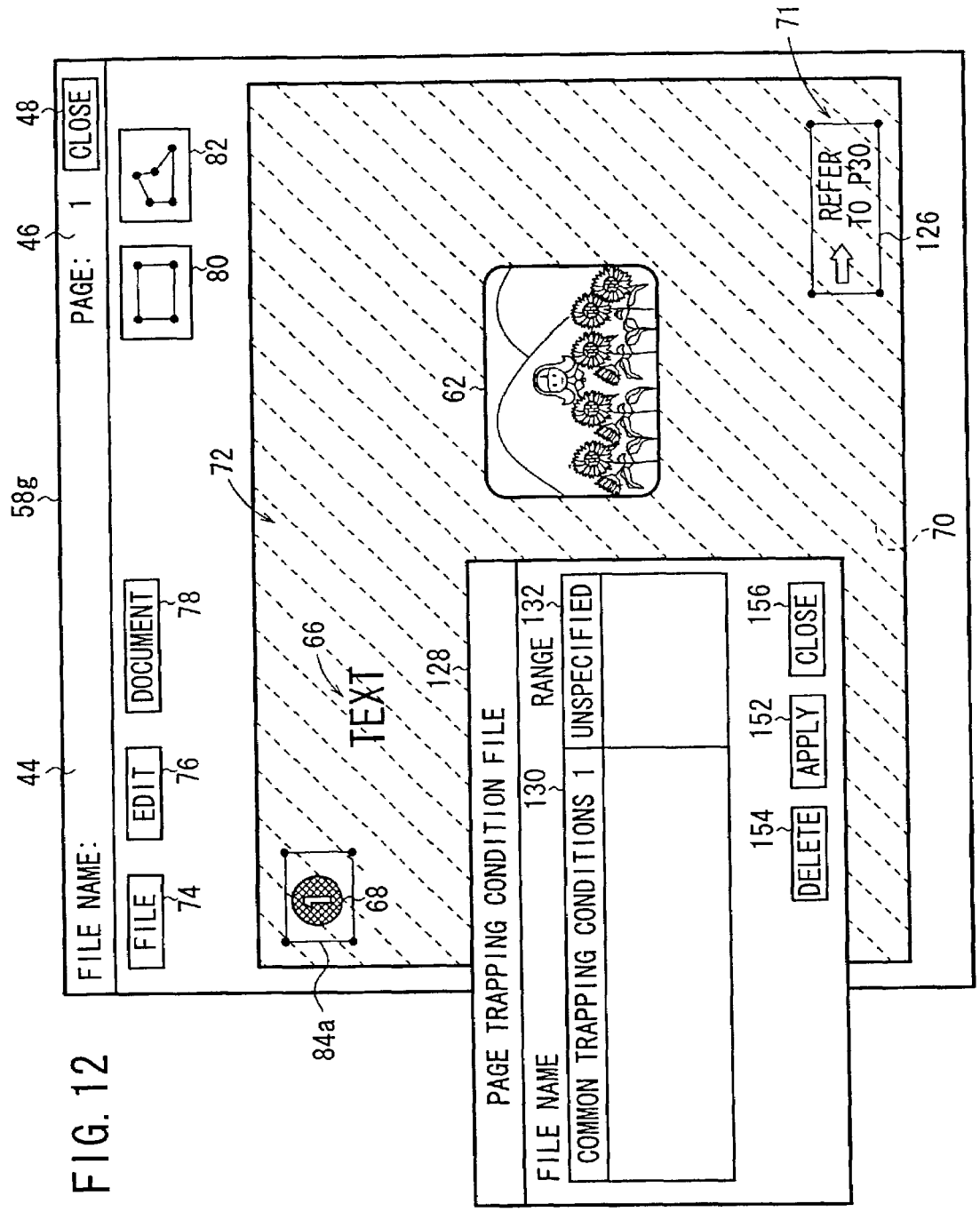
FIG. 12 is a view showing a displayed trapping process view for applying common trapping conditions to other pages.

Then, as shown in FIG. 12, a page trapping condition file view 128 is displayed in a trapping process view 58g, displaying "COMMON TRAPPING CONDITIONS 1" in the file name window 130. "COMMON TRAPPING CONDITIONS 1" in the file name window 130 represent a file name under which trapping conditions for the parameter-established trapping area 84a of the style A (set A of trapping parameters) and trapping conditions for the parameter-established trapping area 126 of the style B (set B of trapping parameters) are established and saved. In this case, a range window 132 for indicating a page or a page range to which "COMMON TRAPPING CONDITIONS 1" are to be applied is "UNSPECIFIED". "COMMON TRAPPING CONDITIONS 1" are displayed in a selectable state in the file name window 130 in the page trapping condition file view 128.

Figure 13:
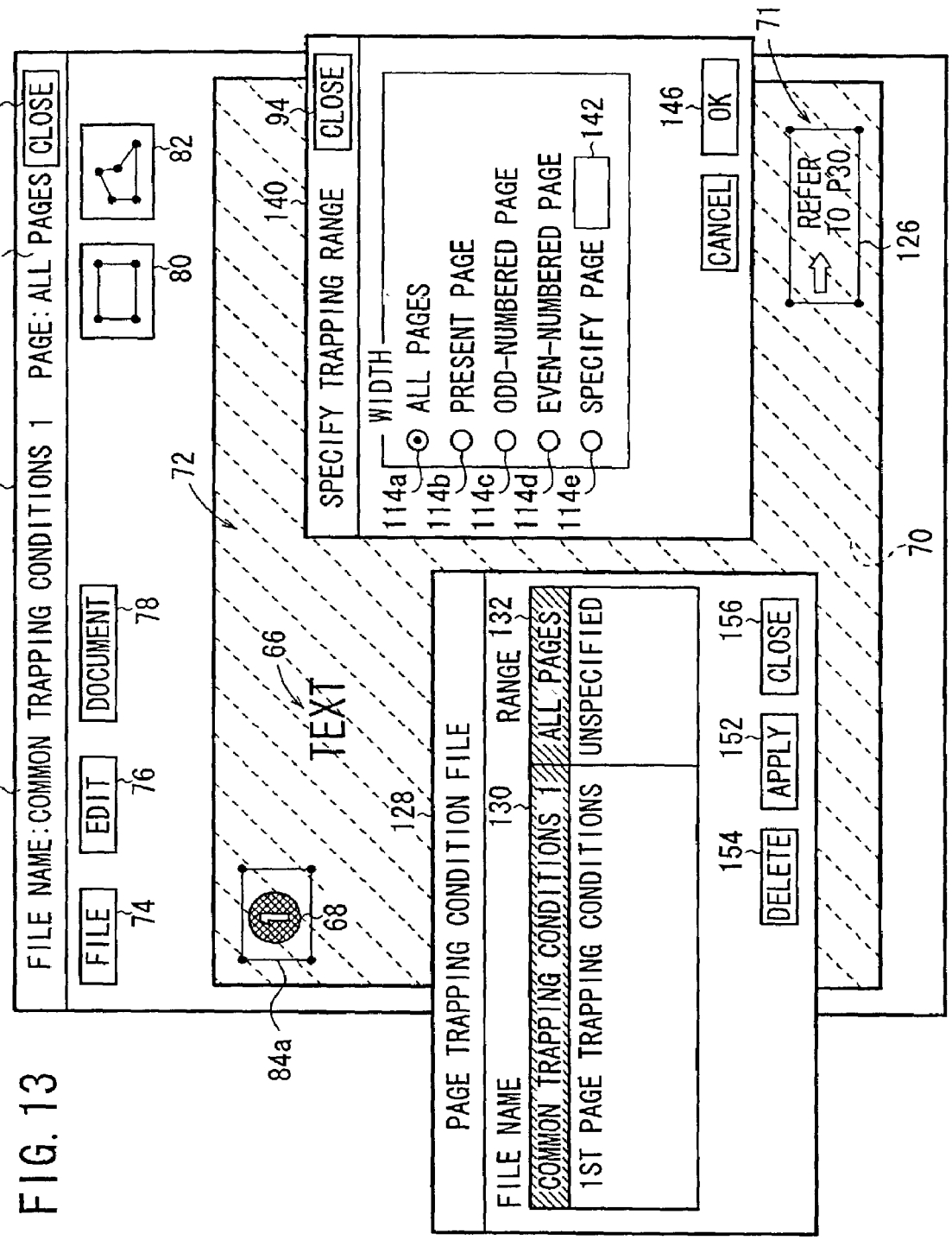
FIG. 13 is a view showing a displayed trapping process view for indicating pages for a trapping range.

When the user selects "COMMON TRAPPING CONDITIONS 1" in the file name window 130 with the mouse 36, and then clicks on the apply button 152, the trapping process view 58a shown in FIG. 12 is updated to trapping process view 58h in which a trapping range page specifying view 140 is displayed as shown in FIG. 13.

In step S6, the user specifies a page or a page range to which "COMMON TRAPPING CONDITIONS 1" are to be applied.

The user may select a desired one of "ALL PAGES", "PRESENT PAGE", "ODD-NUMBERED PAGES", "EVEN-NUMBERED PAGES", or "SPECIFY PAGE" using a page specifying window 142, as a page range to which "COMMON TRAPPING CONDITIONS 1" are to be applied, using check boxes 114a through 114e.

In the trapping range page specifying view 140 shown in FIG. 13, the check box 114a for applying "COMMON TRAPPING CONDITIONS 1" to "ALL PAGES" is shown as checked. Specifically, "COMMON TRAPPING CONDITIONS 1" are indicated to be applied to all the pages ranging from the first page to the 100th page. The range window 132 of selected "COMMON TRAPPING CONDITIONS 1" is changed from "UNSPECIFIED" to "ALL PAGES", and the page field 46 is changed from "1" to "ALL" indicative of all the pages. However, they are not yet finalized.

Then, the user clicks on the OK button 146 to indicate that "COMMON TRAPPING CONDITIONS 1" are to be applied to all the pages.

Figure 14:
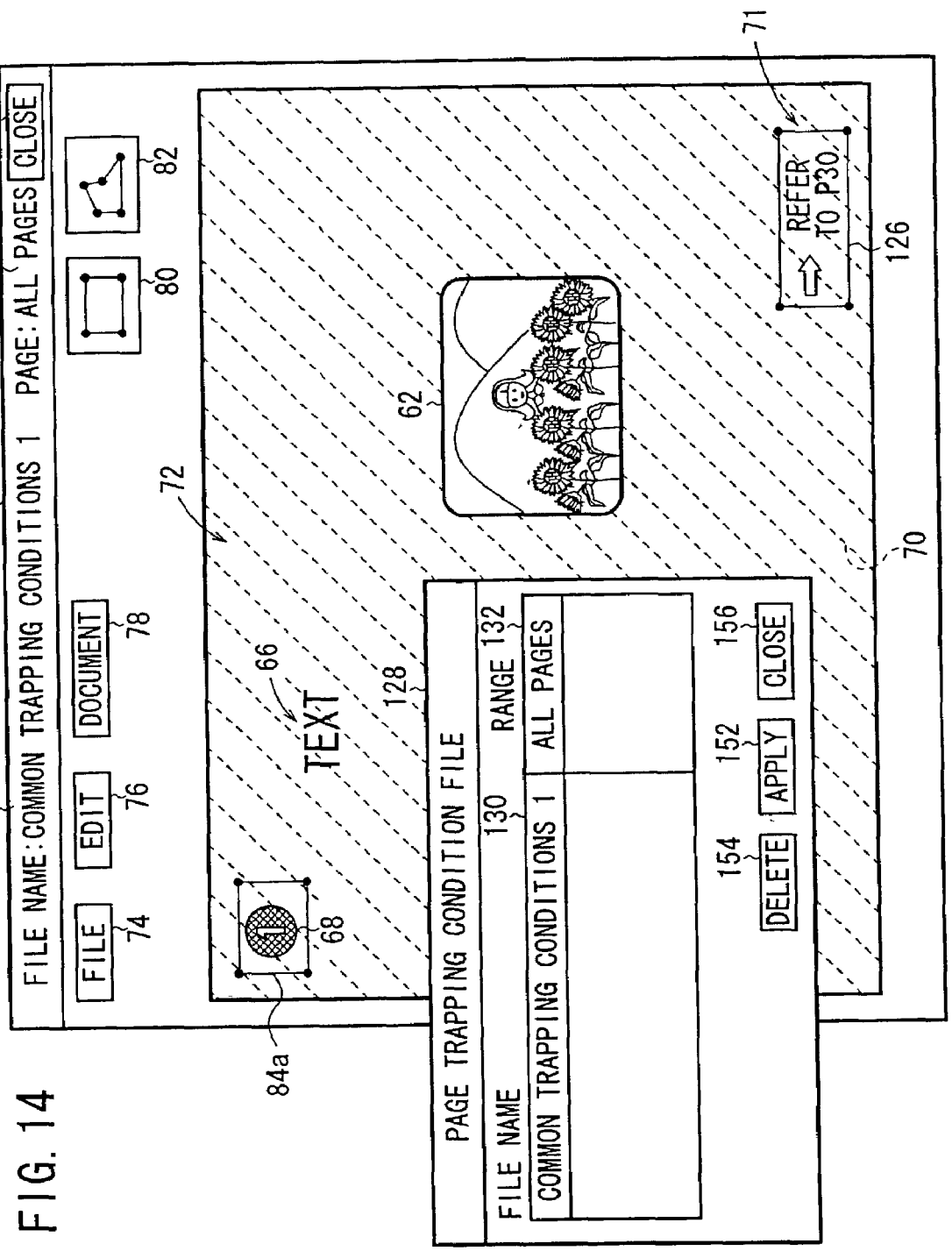
FIG. 14 is a view showing a displayed trapping process view for applying common trapping conditions to other pages.

The trapping process view 58h shown in FIG. 13 now changes to a trapping process view 58i in which the selection of "COMMON TRAPPING CONDITIONS 1" is canceled and a page trapping condition file view 128 with "ALL PAGES" written in a range window 132 is displayed, as shown in FIG. 14.

The processing in step S6 is now put to an end, and PDF data covering all pages as a page range to which "COMMON TRAPPING CONDITIONS 1" is stored in the hard disk 34.

In step S7, it is determined whether the "CLOSE" button 48 as a button for ending the trapping area generating program is clicked on or not. If not clicked on, then control goes back to step S2.

The trapping process view 58i shown in FIG. 14 remains displayed. The user then clicks on a "CLOSE" button 156 in the page trapping condition file view 128.

Then, the user clicks on the file menu button 74, selects "NAME AND SAVE", and inputs and finalizes a file name "1ST PAGE TRAPPING CONDITIONS" in a file name input view, not shown. Now, a first page trapping condition file is generated and stored in the hard disk 34, and a trapping process view 58j shown in FIG. 15 in which "1ST PAGE TRAPPING CONDITIONS" is displayed in the page trapping condition file name field 44 is displayed.

Figure 15:
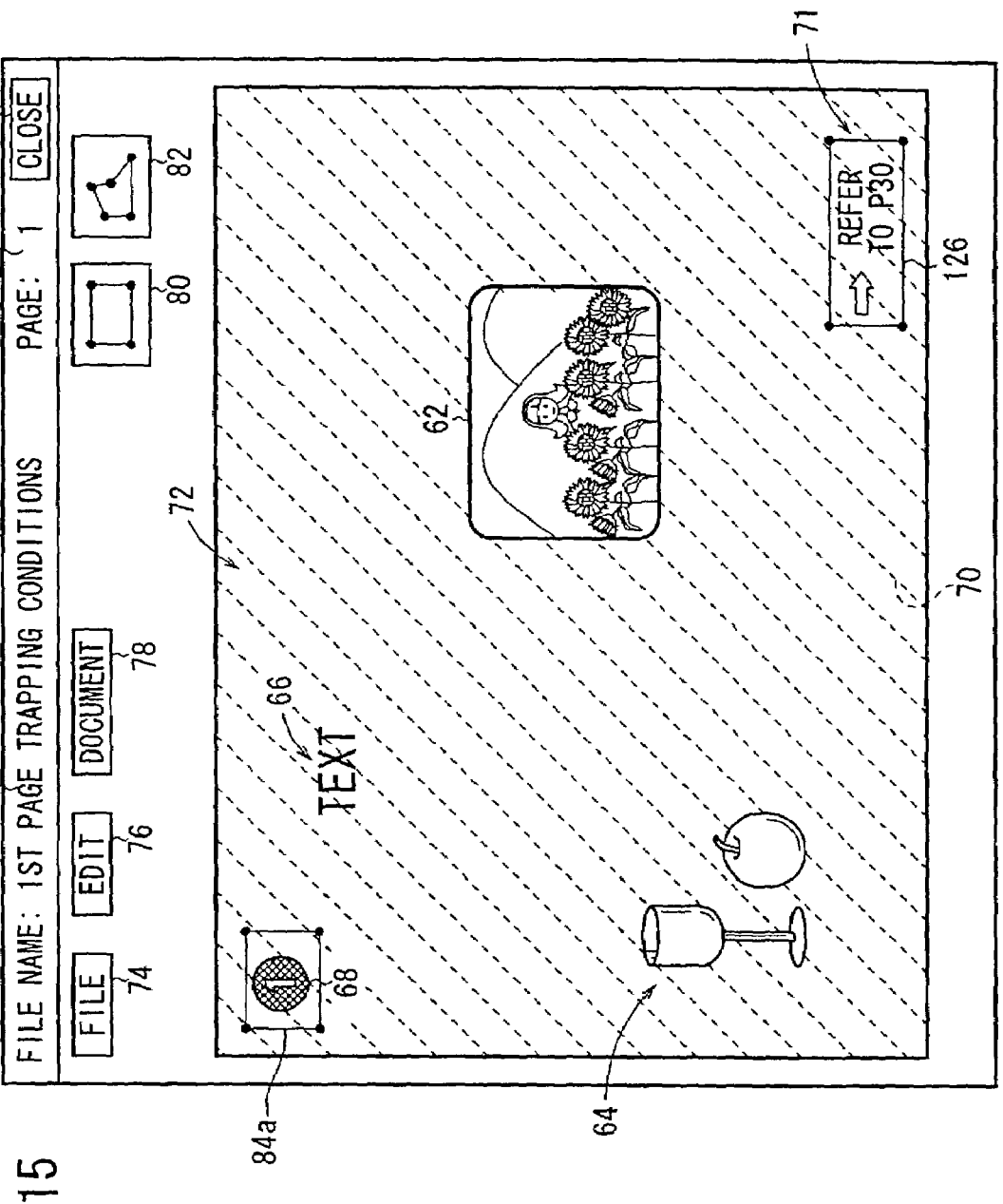
FIG. 15 is a view showing a displayed trapping process view of a first page after trapping conditions have been established.

In the page selecting process in step S2, if the user clicks on the document menu button 78 and selects the start page, then the same window as the trapping process view 58j shown in FIG. 15 is displayed.

Figure 16:
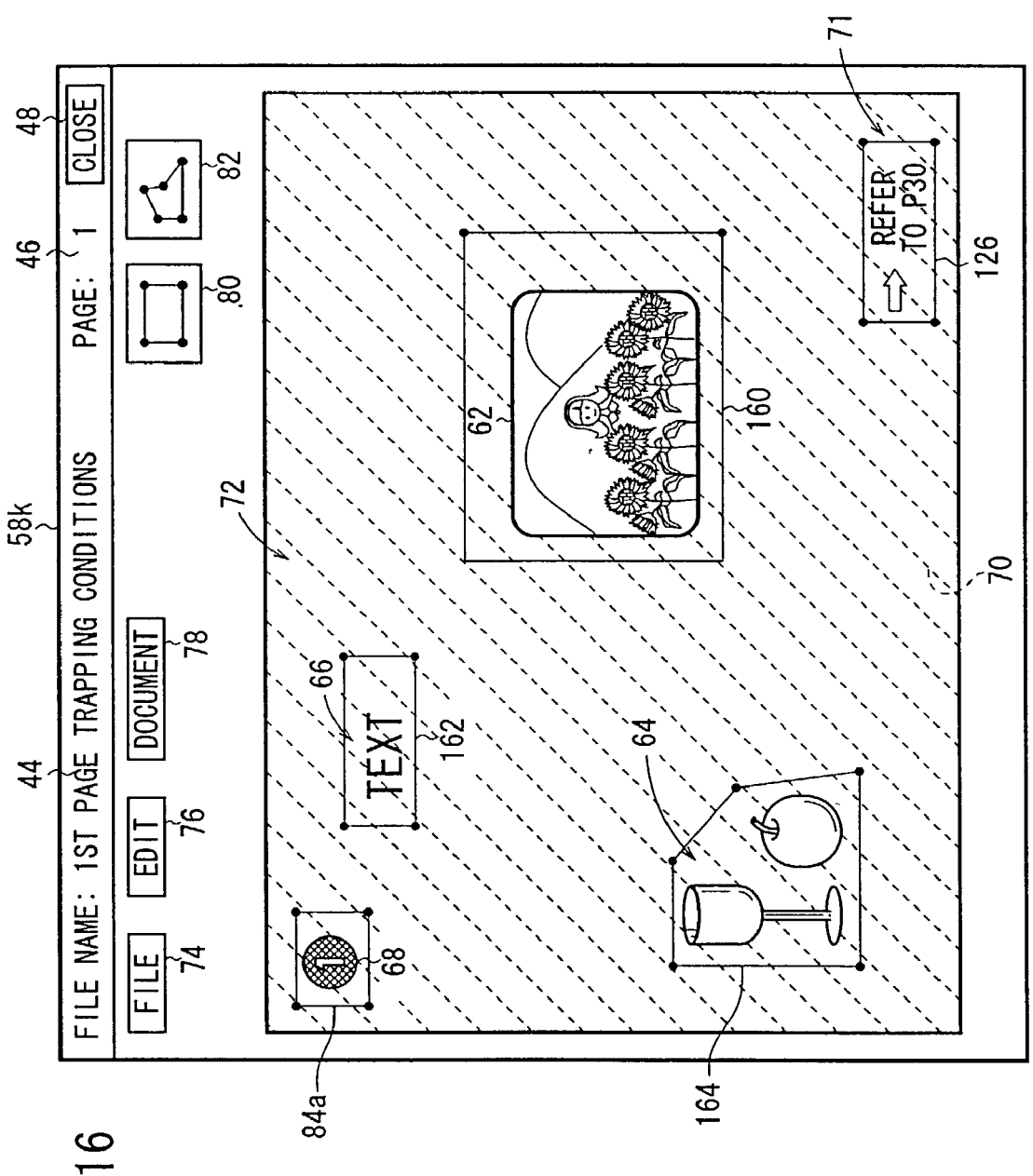
FIG. 16 is a view showing a displayed trapping process view for finalizing trapping conditions for the first page.

Then, trapping conditions are repeatedly specified for the rest of the first page according to the trapping area specifying process in step S3 and the trapping parameter establishing process in step S4, thereby displaying a trapping process view 58k shown in FIG. 16, for example.

The trapping process view 58k displays thereon specified parameter trapping areas 160, 162, 164 in the form of solid-line rectangular and free figure frames indicating that trapping conditions composed of trapping areas and trapping parameters have been specified for the photographic image 62, the line image 64, and the character image 66 which are all objects to be trapped on the first page.

Figure 17:
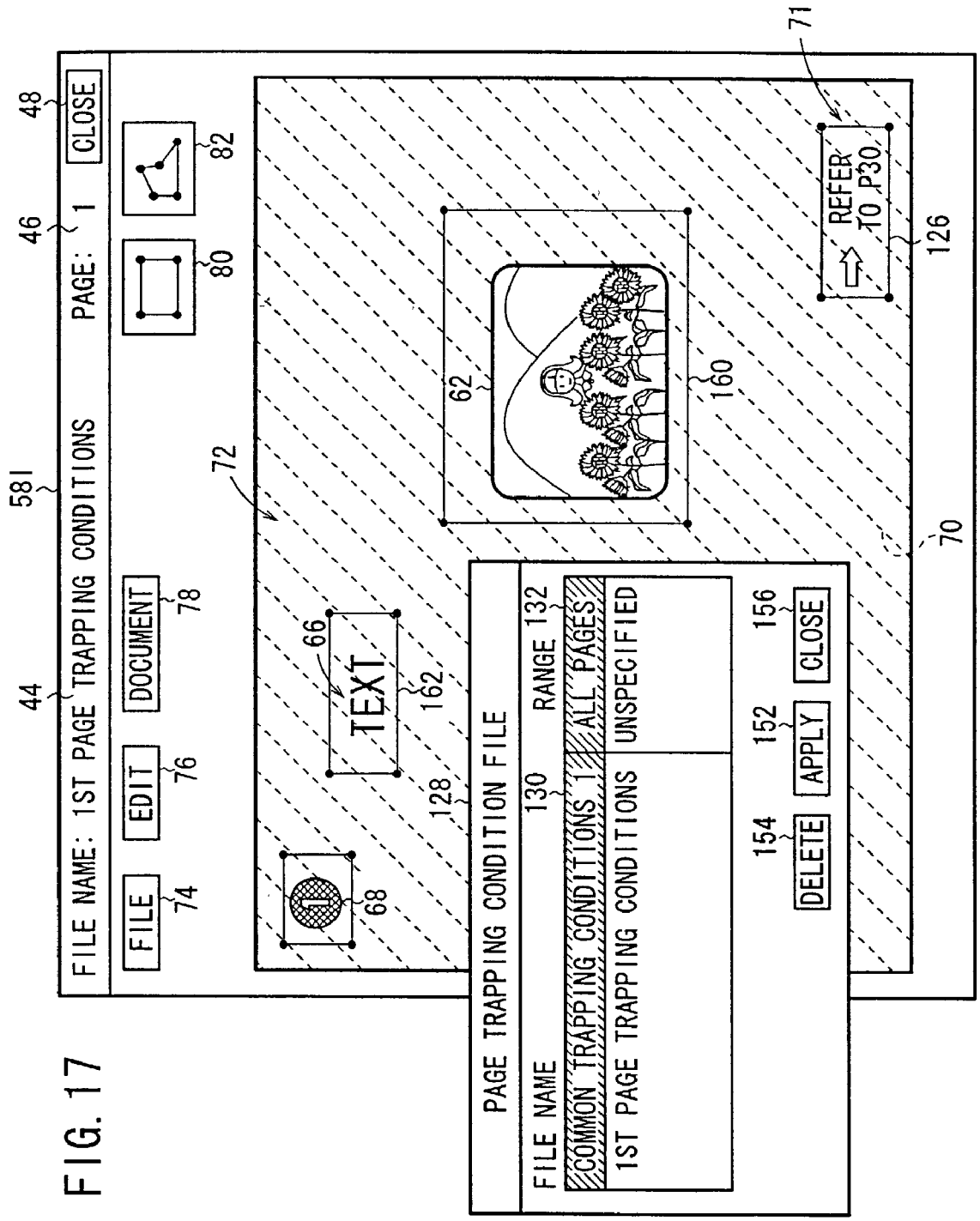
FIG. 17 is a view showing a displayed trapping process view for finalizing trapping conditions for the first page.
Figure 18:
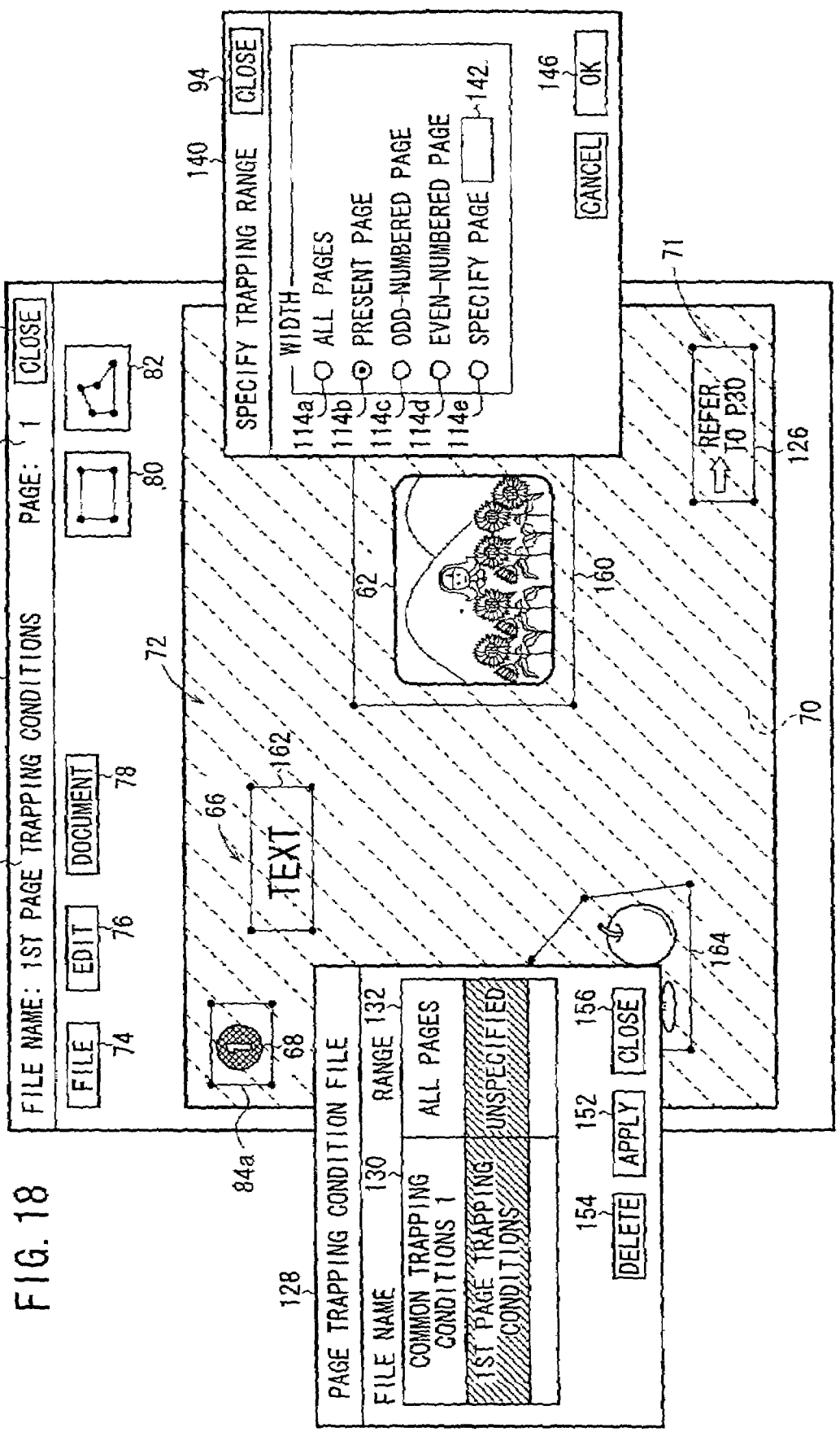
FIG. 18 is a view showing a displayed trapping process view for finalizing trapping conditions for the first page.

The user then clicks on the file menu button 74 and selects "PAGE TRAPPING SAVE", whereupon an updated trapping process view 58l is displayed as shown in FIG. 17. The trapping process view 58l displays the page trapping condition file view 128 thereon. In the file name window 130, the established "COMMON TRAPPING CONDITIONS 1" indicating that the trapping conditions are to be applied to all the pages is selected and displayed in the first line, and "1ST PAGE TRAPPING CONDITIONS" which are being established and in which a page or page range to which trapping conditions are to be applied is not unspecified is displayed in the second line.

The user then selects "1ST PAGE TRAPPING CONDITIONS" from the file name window 130, and clicks on the apply button 152, whereupon the trapping process view 58l is updated to a trapping process view 58m in which the trapping range page specifying view 140 is displayed as shown in FIG. 13.

Figure 19:
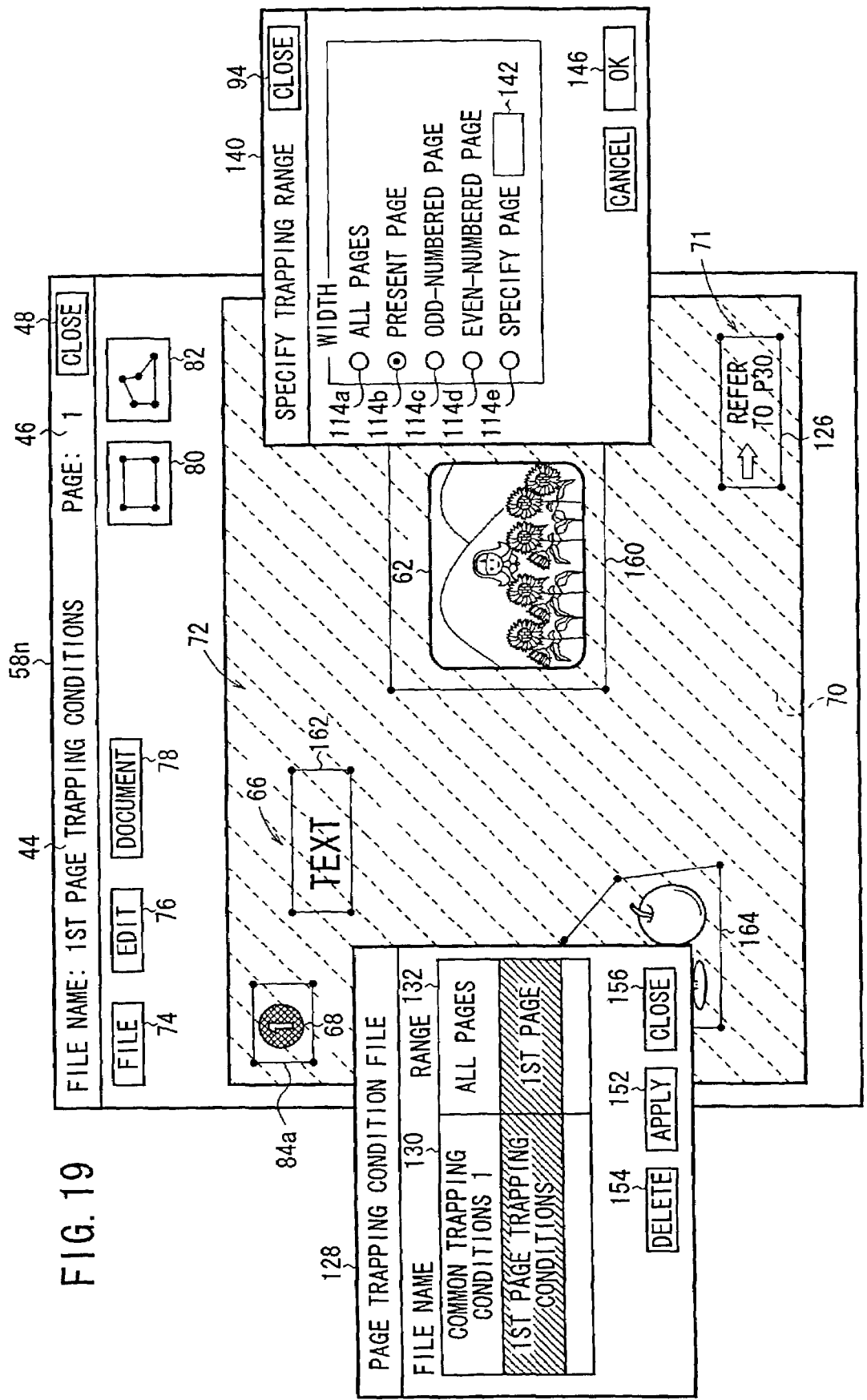
FIG. 19 is a view showing a displayed trapping process view for finalizing trapping conditions for the first page.

The user then specifies again a page or page range to which "1ST PAGE TRAPPING CONDITIONS" are to be applied. The user selects the check box 144b for "RESENT PAGE" and clicks on the OK button 146, thus changing the range window 132 of "1ST PAGE TRAPPING CONDITIONS" being selected from "UNSPECIFIED" to "1ST PAGE", as can be seen from a trapping process view 58n shown in FIG. 19.

Then, the user clicks on the OK button 146 to indicate that "1ST PAGE TRAPPING CONDITIONS" are to be applied to the first page. In this manner, the PDF 220 (see FIG. 3) having the image of the first page and the trapping condition is generated.

Figure 20:
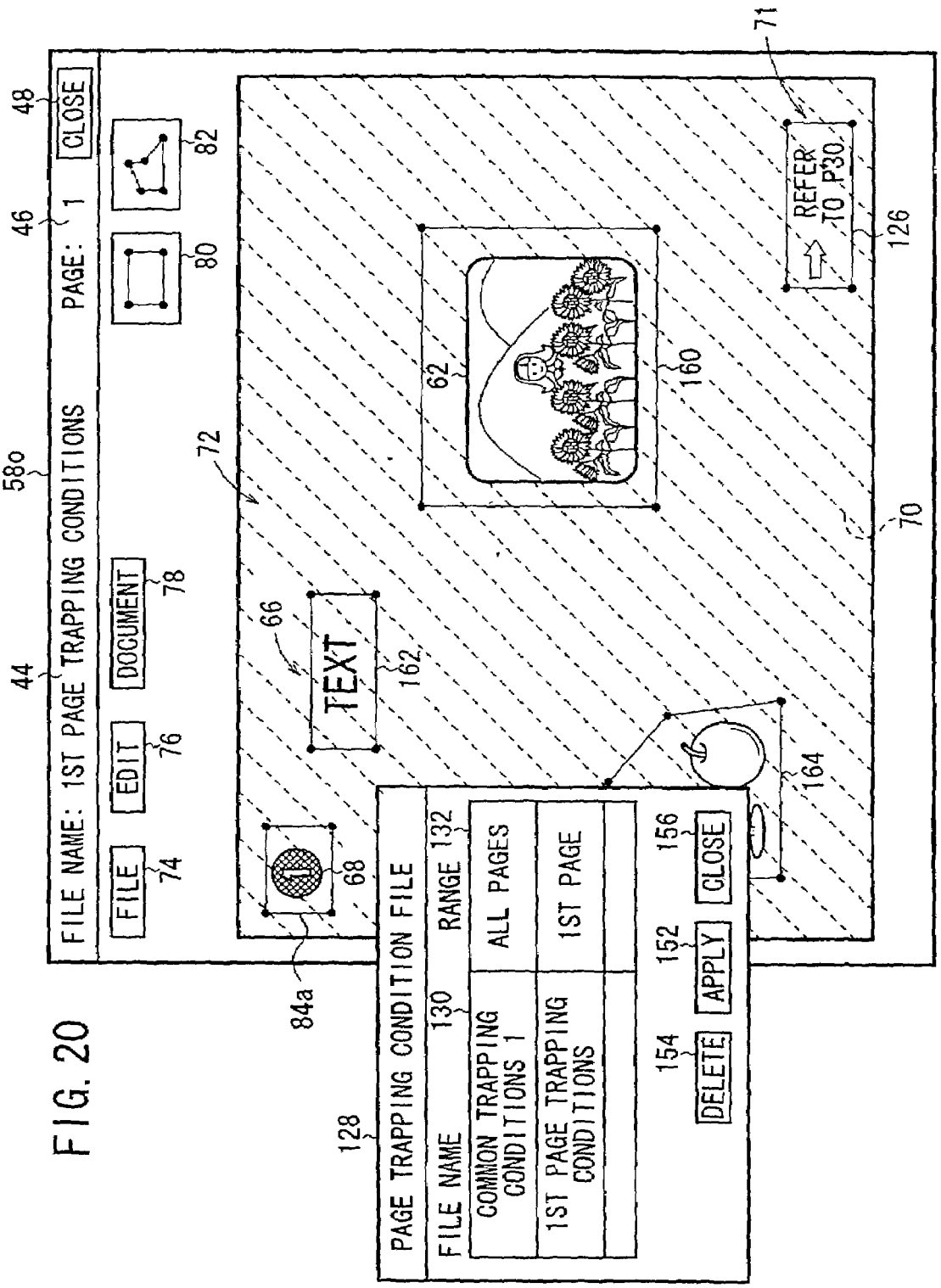
FIG. 20 is a view showing a displayed trapping process view for finalizing trapping conditions for the first page.

The trapping process view 58n now changes to a trapping process view 58o in which the selection of "1ST PAGE TRAPPING CONDITIONS" is canceled and a page trapping condition file view 128 with "1ST PAGE" written in a range window 132 is displayed, as shown in FIG. 20.

At this time, the setting of "COMMON TRAPPING CONDITIONS 1" to be applied to all the pages and "1ST PAGE TRAPPING CONDITIONS" to be applied to the first page is completed. If the user clicks on the "CLOSE" button 156 in the page trapping condition file view 128, the page trapping condition file view 128 disappears. If the user clicks on the document menu button 78 and selects the established page trapping condition file, then page trapping condition file view 128 is displayed for the user to confirm its contents. While the page trapping condition file view 128 is being displayed, the user may select certain trapping conditions, and then clicks on a delete button 154 to delete the selected trapping conditions.

In step S7, it is determined whether the "CLOSE" button 48 as a button for ending the trapping area generating program is clicked on or not. If not clicked on, then control goes back to step S2.

Then, the page trapping process for the second and following pages is carried out. In the present embodiment, the common trapping conditions 1 have already been applied to the second and following pages. Therefore, when the image of the second page is displayed, the specified parameter trapping areas have been displayed in the corresponding portions of the image, and the user may specify trapping conditions for the rest of the image.

Subsequently, the user specifies trapping conditions in the same manner as described until the final page is reached. When the user clicks on the "CLOSE" button 48, the process of establishing trapping conditions for the printed material is finished. As a result, PDF data 220 having images of all the pages and trapping conditions have been obtained with respect to all the pages.

When the PDF data 220 thus obtained with respect to all the pages are supplied to the RIP 14, the RIP 14 outputs films 204, 206, 208, 210 in the colors of C, M, Y, K to which the trapping process has been performed, for all the pages.

In the present embodiment, it is not necessary to specify trapping conditions for image portions with respect to "COMMON TRAPPTING CONDITIONS 1" from the second page until the final page. Consequently, the period of time required to establish trapping condition can be shortened. Because it is not necessary to specify trapping areas for image portions where common trapping conditions are applied, trapping conditions can be specified at the same coordinate positions exactly in the pages.

In the above embodiment, trapping conditions established for a portion of the image of a certain page are applied to other pages. If a printed material have identical trapping conditions for its pages, then trapping conditions established for the entire image of a certain one of the pages may be applied to the images of all the remaining pages, for thereby greatly reducing the period of time required to establish trapping conditions for the printed material.

According to the foregoing embodiment, therefore, it is possible to eliminate the time and labor which would otherwise be required to specify trapping areas and trapping parameters with respect to routine pattern areas for pages of a multipage document which contains routine patterns such as the pagination image 68 which need to have trapping conditions specified therefor.

According to the present invention, as described above, since trapping conditions established for a portion of the image of a certain page can be applied to other pages, the process of inputting trapping conditions such as to specify trapping areas in the other pages can be eliminated. Thus, the trapping process is made efficient and the period of time required by the trapping process is greatly reduced.

Although a certain preferred embodiment of the present invention has been shown and described in detail, it should be understood that various changes and modifications may be made therein without departing from the scope of the appended claims.

What is claimed is:

1. A method of applying trapping conditions in an image processing apparatus having a memory device for storing image information of pages of a printed material having a plurality of pages as page data, a display unit for displaying an image represented by the page data loaded in a memory, and an input device for establishing trapping conditions for the page data corresponding thereto based on the displayed image, comprising the steps of:
   (a) establishing trapping conditions for page data through said input device based on the image of a given page, corresponding to the page data, which is displayed on said display unit;
   (b) saving the trapping conditions established for the page data of the given page in said memory device; and
   (c) specifying another page to which the trapping conditions established and saved for the page data of the given page are to be applied.

2. A method according to claim 1, wherein said step (a) comprises the step of:
   establishing trapping conditions for all or part of the image of the given page.

3. A method according to claim 1, wherein said step (c) comprises the steps of:
   displaying a trapping condition applying page specifying view on said display unit; and
   inputting data through said input device to specify the other page to which the trapping conditions established and saved for the page data of the given page are to be applied.

4. A method according to claim 1, wherein said trapping conditions include a trapping parameter including a trap width and a trapping area in said step (c).

5. A method according to claim 1, wherein said step (a) comprises the step of:
   establishing trapping conditions for a pagination image of the image of the given page.

6. A method according to claim 1, wherein said step (a) comprises the step of:
   establishing trapping conditions for footer, header, or logotype of the image of the given page.

7. The method of claim 1, wherein establishing trapping conditions for page data through said input device includes at least one of selecting a trapping condition from multiple conditions and editing a trapping condition from multiple conditions.

8. The method of claim 1, wherein the page data includes multiple sections and establishing trapping conditions for the page data comprises individually selecting conditions for each of the multiple sections.

9. A computer readable medium storing a computer program executable by a computer, said program comprising the steps of:

reading page data of a given page from an auxiliary memory device which stores image information of pages of a printed material having a plurality of pages as page data, and displaying an image of said given page on a display unit based on the page data loaded in a main memory;

saving trapping conditions established for the page data of the given page in said auxiliary memory device when the trapping conditions are established for the page data of the given page through an input device based on the image of the given page which is displayed on said display unit; and specifying another page to which the trapping conditions established and saved for the page data of the given page are to be applied, through said input device.

* * * * *